(12) United States Patent
Yano

(10) Patent No.: US 12,136,699 B2
(45) Date of Patent: Nov. 5, 2024

(54) NONAQUEOUS ELECTROLYTE SOLUTION OF LITHIUM ION SECONDARY BATTERY, AND LITHIUM ION SECONDARY BATTERY

(71) Applicant: Prime Planet Energy & Solutions, Inc., Tokyo (JP)

(72) Inventor: Yuta Yano, Seto (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 354 days.

(21) Appl. No.: 17/536,102

(22) Filed: Nov. 29, 2021

(65) Prior Publication Data

US 2022/0173437 A1 Jun. 2, 2022

(30) Foreign Application Priority Data

Dec. 1, 2020 (JP) .................................. 2020-199331

(51) Int. Cl.
*H01M 10/0567* (2010.01)
*H01M 10/0525* (2010.01)
*H01M 10/0569* (2010.01)

(52) U.S. Cl.
CPC ... *H01M 10/0567* (2013.01); *H01M 10/0525* (2013.01); *H01M 10/0569* (2013.01); *H01M 2300/0028* (2013.01)

(58) Field of Classification Search
CPC ......... H01M 10/0567; H01M 10/0525; H01M 10/0569; H01M 2300/0028
See application file for complete search history.

(56) References Cited

U.S. PATENT DOCUMENTS

| | | | |
|---|---|---|---|
| 4,668,595 A | 5/1987 | Yoshino et al. | |
| 6,136,477 A * | 10/2000 | Gan ................... | H01M 10/0569 429/218.1 |
| 2002/0068222 A1* | 6/2002 | Ishii ..................... | H01M 4/628 429/347 |
| 2003/0003370 A1 | 1/2003 | Arai et al. | |
| 2005/0106471 A1* | 5/2005 | Kim ..................... | H01M 10/052 429/200 |
| 2006/0003226 A1 | 1/2006 | Sawa et al. | |
| 2007/0224505 A1 | 9/2007 | Kita et al. | |
| 2010/0099031 A1* | 4/2010 | Kato ................. | H01M 10/0567 429/345 |
| 2015/0140448 A1 | 5/2015 | Takiguchi et al. | |
| 2016/0336621 A1 | 11/2016 | Yokomizo et al. | |
| 2017/0155175 A1 | 6/2017 | Halalay et al. | |
| 2020/0335825 A1* | 10/2020 | Hancock ........... | H01M 10/0568 |

(Continued)

FOREIGN PATENT DOCUMENTS

| | | |
|---|---|---|
| CN | 101047267 A | 10/2007 |
| CN | 104412441 A | 3/2015 |
| CN | 105556729 A | 5/2016 |

(Continued)

*Primary Examiner* — Ula C Ruddock
*Assistant Examiner* — Olivia Mason Ruggiero
(74) *Attorney, Agent, or Firm* — HAUPTMAN HAM, LLP

(57) ABSTRACT

Provided is a technology that allows precipitated metallic lithium to be rendered harmless in a lithium ion secondary battery. The nonaqueous electrolyte solution of a lithium ion secondary battery disclosed herein contains a lithium salt as an electrolyte salt, a nonaqueous solvent, and an aromatic carboxylic acid compound and an aryl halide compound, as additives.

6 Claims, 3 Drawing Sheets

(56) References Cited

U.S. PATENT DOCUMENTS

2022/0216521 A1    7/2022  Xie et al.

FOREIGN PATENT DOCUMENTS

| | | |
|---|---|---|
| CN | 105917516 A | 8/2016 |
| CN | 106340671 A | 1/2017 |
| CN | 106816626 A | 6/2017 |
| CN | 109449486 A | 3/2019 |
| CN | 110890592 A | 3/2020 |
| JP | H424831 B2 | 4/1992 |
| JP | H6150975 A | 5/1994 |
| JP | H09199168 A | 7/1997 |
| JP | 2009110798 A | 5/2009 |
| JP | 2010257989 A | 11/2010 |
| JP | 2016085885 A | 5/2016 |
| WO | 2014165748 A1 | 10/2014 |

* cited by examiner

NONAQUEOUS ELECTROLYTE SOLUTION OF LITHIUM ION SECONDARY BATTERY, AND LITHIUM ION SECONDARY BATTERY

BACKGROUND OF THE INVENTION

1. Field of the Invention

The present disclosure relates to a nonaqueous electrolyte solution of a lithium ion secondary battery. The present disclosure also relates to a lithium ion secondary battery which utilizes that nonaqueous electrolyte solution. The present application claims priority based on Japanese Patent Application No. 2020-199331 filed on Dec. 1, 2020, the entire contents whereof are incorporated in the present specification by reference.

2. Description of the Related Art

In recent years, lithium ion secondary batteries have come to being suitably used as portable power sources in personal computers, mobile terminals and the like, and as power sources for vehicle drive in battery electric vehicles (BEV), hybrid electric vehicles (HEV) and plug-in hybrid electric vehicles (PHEV).

An active material capable of storing and releasing lithium ions, and a lithium salt as an electrolyte salt, are generally used in the lithium ion secondary batteries, since lithium ions are involved in the charging and discharging reactions (see, for instance, Japanese Patent Application Publication No. H04-24831 and Japanese Patent Application Publication No. H06-150975).

SUMMARY OF THE INVENTION

Meanwhile, in the lithium ion secondary batteries, it is known that lithium ions may precipitate in the form of metallic lithium on electrodes. When the metallic lithium precipitates on an electrode, problems arise in that capacity drops and also in that dendritic growth of the precipitated metallic lithium may give rise to internal short-circuits. A demand exists therefore for technologies that allow rendering precipitated metallic lithium harmless.

Therefore, it is an object of the present disclosure to provide a technology that allows rendering precipitated metallic lithium harmless in a lithium ion secondary battery.

The nonaqueous electrolyte solution of a lithium ion secondary battery disclosed herein contains: a lithium salt as an electrolyte salt; a nonaqueous solvent; and an aromatic carboxylic acid compound and an aryl halide compound, as additives. By using a nonaqueous electrolyte solution having such a configuration in a lithium ion secondary battery, it becomes possible to render precipitated metallic lithium harmless in the lithium ion secondary battery.

In a desired implementation of the nonaqueous electrolyte solution of a lithium ion secondary battery disclosed herein, the concentration of the aromatic carboxylic acid compound is not less than 0.01 mmol/L but not more than 100 mmol/L, and the concentration of the aryl halide compound is not less than 0.01 mmol/L but not more than 100 mmol/L. The effect of rendering precipitated metallic lithium harmless is particularly pronounced in such a configuration.

In a desired implementation of the nonaqueous electrolyte solution of a lithium ion secondary battery disclosed herein, the nonaqueous solvent is a carbonate. The effect of rendering precipitated metallic lithium harmless is particularly pronounced in such a configuration.

In a desired implementation of the nonaqueous electrolyte solution of a lithium ion secondary battery disclosed herein, the aromatic carboxylic acid compound is benzoic acid or 2-naphthalene carboxylic acid, and the aryl halide compound is an aryl iodide compound. The effect of rendering precipitated metallic lithium harmless is particularly pronounced in such a configuration.

The lithium ion secondary battery disclosed herein has: a positive electrode, a negative electrode, and the above nonaqueous electrolyte solution. By virtue of such a configuration, a lithium ion secondary battery is provided in which precipitated metallic lithium can be rendered harmless.

DESCRIPTION OF THE PREFERRED EMBODIMENTS

Figure 1:
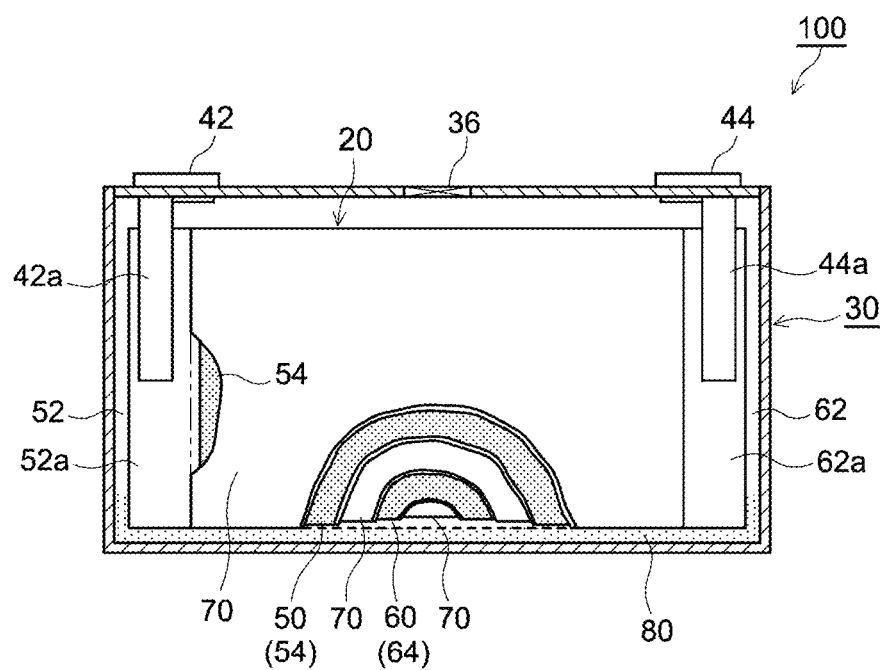
FIG. 1 is a cross-sectional diagram illustrating schematically the internal structure of a lithium ion secondary battery that utilizes a nonaqueous electrolyte solution according to an embodiment of the present disclosure.

Embodiments of the present disclosure will be explained below with reference to accompanying drawings. Any features other than the matter specifically set forth in the present specification and that may be necessary for carrying out the present disclosure can be regarded as design matter for a person skilled in the art based on conventional art in the relevant field. The present disclosure can be realized on the basis of the disclosure of the present specification and common technical knowledge in the relevant field.

In the present specification, the term "secondary battery" denotes a power storage device in general that is capable of being charged and discharged repeatedly, and encompasses so-called storage batteries and power storage elements such as electrical double layer capacitors. In the present specification, the term "lithium ion secondary battery" denotes a secondary battery that utilizes lithium ions as charge carriers, and in which charging and discharging are realized as a result of movement of charge with lithium ions, between a positive electrode and a negative electrode.

The nonaqueous electrolyte solution of a lithium ion secondary battery according to the present embodiment contains a lithium salt as an electrolyte salt, a nonaqueous solvent, and an aromatic carboxylic acid compound and an aryl halide compound as additives.

A known lithium salt used as an electrolyte salt of nonaqueous electrolyte solutions of lithium ion secondary batteries may be used herein as the lithium salt. Examples of lithium salts that can be used include $LiPF_6$, $LiBF_4$, lithium bis(fluorosulfonyl)imide (LiFSI), lithium bis(trifluoromethane) sulfone imide (LiTFSI) and the like. The foregoing can be used singly or in combinations of two or more types. Herein, $LiPF_6$ is desirable as the lithium salt. The concentration of the lithium salt in the nonaqueous electrolyte solution is not particularly limited, but is desirably from 0.7 mol/L to 1.3 mol/L.

The nonaqueous solvent is not particularly limited, and a known nonaqueous solvent used in nonaqueous electrolyte solutions of lithium ion secondary batteries can be used herein. Specific examples include carbonates, ethers, esters, nitriles, sulfones and lactones. Ethers and carbonates are desirable, and carbonates are more desirable, since these afford a particularly pronounced effect of rendering precipitated metallic lithium harmless.

Examples of ethers include chain ethers such as dimethoxyethane, diethyl ether, 1,3-dioxolane, glyme, diglyme, triglyme and tetraglyme; and cyclic ethers such as dioxane, tetrahydrofuran and 2-methyltetrahydrofuran. The foregoing can be used singly or in combinations of two or more types.

Examples of carbonates include ethylene carbonate (EC), diethyl carbonate (DEC), dimethyl carbonate (DMC), ethyl methyl carbonate (EMC), monofluoroethylene carbonate (MFEC), difluoroethylene carbonate (DFEC), monofluoromethyldifluoromethyl carbonate (F-DMC) and trifluorodimethyl carbonate (TFDMC). The foregoing can be used singly or in combinations of two or more types. Desirably, the carbonate contains at least one selected from the group consisting of ethylene carbonate, dimethyl carbonate and ethyl methyl carbonate, and more desirably is a mixed solvent containing at least two selected from the group consisting of ethylene carbonate, dimethyl carbonate and ethyl methyl carbonate.

In the present embodiment, an aromatic carboxylic acid compound and an aryl halide compound are used in combination as an additive. By using these in combination, it becomes possible to render precipitated metallic lithium harmless in a lithium ion secondary battery provided with the nonaqueous electrolyte solution of the present embodiment.

The aromatic carboxylic acid compound that is used is not particularly limited so long as it is a compound in which a carboxyl group is bonded to an aromatic ring. The aromatic carboxylic acid compound may be substituted or unsubstituted. Examples of the aromatic ring include a benzene ring, a naphthalene ring, an anthracene ring, a phenanthrene ring, a pyridine ring, a furan ring and a thiophene ring. Examples of substituents include an alkyl group (in particular an alkyl group having 1 to 4 carbon atoms), a hydroxyl group, a nitro group, an imino group, an amide group, an amino group and an alkoxy group (in particular an alkoxy group having 1 to 4 carbon atoms). The aromatic carboxylic acid compound may have two or more carboxyl groups.

Concrete examples of the aromatic carboxylic acid compound include benzoic acid; naphthalene carboxylic acids such as 1-naphthalene carboxylic acid and 2-naphthalene carboxylic acid; anthracene carboxylic acids such as 1-anthracene carboxylic acid, 2-anthracene carboxylic acid and 9-anthracene carboxylic acid; benzenedicarboxylic acids such as phthalic acid, isophthalic acid and terephthalic acid; as well as compounds in which these aromatic carboxylic acid compounds are substituted with the substituents enumerated above. The foregoing can be used singly or in combinations of two or more types. From the viewpoint of suppressing unintended side reactions, the aromatic carboxylic acid compound is desirably unsubstituted, and is more desirably benzoic acid or naphthalene carboxylic acid.

The aryl halide compound that is used herein is not particularly limited so long as it is a compound in which a halogen atom is bonded to an aromatic ring. The aryl halide compound may be substituted or unsubstituted. Examples of the aromatic ring include a benzene ring, a naphthalene ring, an anthracene ring, a phenanthrene ring, a pyridine ring, a furan ring and a thiophene ring. Examples of the halogen atom include a chlorine atom, a bromine atom and an iodine atom, desirably an iodine atom. Examples of substituents include an alkyl group (in particular an alkyl group having 1 to 4 carbon atoms), a hydroxyl group, a nitro group, an amino group and an alkoxy group (in particular an alkoxy group having 1 to 4 carbon atoms). The aryl halide compound may have two or more halogen atoms.

Concrete examples of the aryl halide compound include benzene halides such as chlorobenzene, bromobenzene and iodobenzene; naphthalene halides such as 1-chloronaphthalene, 2-chloronaphthalene, 1-bromonaphthalene, 2-bromonaphthalene, 1-iodonaphthalene and 2-iodonaphthalene; anthracene halides such as 1-chloroanthracene, 2-chloroanthracene, 9-chloroanthracene, 1-bromoanthracene, 2-bromoanthracene, 9-bromoanthracene, 1-iodoanthracene, 2-iodoanthracene and 9-iodoanthracene; and compounds in which the foregoing are substituted with the substituents enumerated above. The foregoing can be used singly or in combinations of two or more types. From the viewpoint of suppressing unintended side reactions, the aryl halide compound is desirably unsubstituted, and is more desirably a benzene halide or a naphthalene halide.

Desired herein is a combination of an aryl iodide compound and benzoic acid or 2-naphthalene carboxylic acid, more desirably a combination of a naphthalene iodide and benzoic acid or 2-naphthalene carboxylic acid, since in that case the effect of rendering precipitated metallic lithium harmless is more pronounced.

The concentration of the aromatic carboxylic acid compound in the nonaqueous electrolyte solution is not particularly limited. The effect of rendering precipitated metallic lithium harmless becomes more pronounced as the concentration of the aromatic carboxylic acid compound increases, up to a given value of concentration. When the concentration of the aromatic carboxylic acid compound exceeds that given value, however, the effect of rendering precipitated metallic lithium harmless is saturated. Accordingly, the concentration of the aromatic carboxylic acid compound in the nonaqueous electrolyte solution is desirably not less than 0.001 mmol/L (0.001 mM) but not more than 500 mmol/L, more desirably not less than 0.01 mmol/L but not more than 100 mmol/L, yet more desirably not less than 0.1 mmol/L but not more than 100 mmol/L, and most desirably not less than 1 mmol/L but not more than 100 mmol/L.

The concentration of the aryl halide compound in the nonaqueous electrolyte solution is not particularly limited. The effect of rendering precipitated metallic lithium harmless becomes more pronounced as the concentration of the aryl halide compound increases, up to a given value of concentration. When the concentration of the aryl halide compound exceeds that given value, however, the effect of rendering precipitated metallic lithium harmless is saturated. Therefore, the concentration of the aryl halide compound in the nonaqueous electrolyte solution is desirably not less than 0.001 mmol/L (0.001 mM) but not more than 500 mmol/L, more desirably not less than 0.01 mmol/L but not more than 100 mmol/L, yet more desirably not less than 0.1 mmol/L but not more than 100 mmol/L, and most desirably not less than 1 mmol/L but not more than 100 mmol/L.

The proportion between the aromatic carboxylic acid compound used and the aryl halide compound used is not particularly limited, but desirably the proportion is from 10:1 to 1:10, more desirably from 5:1 to 1:5, yet more desirably from 2:1 to 1:2, and most desirably 1:1, in terms of the molar ratio (carboxyl group:halogen atom) of the carboxyl group of the aromatic carboxylic acid compound and the halogen atom of the aryl halide compound.

The underlying mechanism for rendering precipitated metallic lithium harmless on the electrodes of the lithium ion secondary battery, due to a combination of an aromatic carboxylic acid compound and an aryl halide compound, is deemed to be as follows.

When an aromatic carboxylic acid compound and an aryl halide compound are co-present in a lithium ion secondary battery, a reaction occurs that is accompanied by decarboxylation (in particular, a coupling reaction represented by Formula (I) below).

$$Ar^1\text{-COOH} + Ar^2\text{-X} \rightarrow Ar^1\text{-}Ar^2 + CO_2 \qquad (I)$$

The produced carbon dioxide ($CO_2$) reacts with metallic lithium (Li) precipitated on the negative electrode, to generate lithium carbonate ($LiCO_3$). In the lithium ion secondary battery, $LiCO_3$ is a component of a coating film (SEI film) that is formed on the negative electrode. Therefore, the generated $LiCO_3$ is immobilized in the form of part of the coating film on the negative electrode, and Li is rendered harmless as a result.

Since it is herein carbon dioxide which directly acts so as to render harmless metallic lithium precipitated on the negative electrode, it is also conceivable to incorporate carbon dioxide beforehand into the nonaqueous electrolyte solution. Incorporating carbon dioxide beforehand into the nonaqueous electrolyte solution, however, is disadvantageous in that surplus volume derived from thermal expansion of the lithium ion secondary battery, as the battery heats up, is smaller in that case.

On the other hand, metallic lithium often precipitates gradually in the course of repeated charging and discharging. The coupling reaction represented by Formula (I) does not occur readily, and hence does not proceed rapidly, but gradually, as the lithium ion secondary battery is used. In the present embodiment, therefore, the aromatic carboxylic acid compound and the aryl halide compound are allowed to be co-present, so that the slowness of the reaction rate of the foregoing is exploited to thereby make it possible to generate carbon dioxide ($CO_2$) gradually, and to bring closer to each other the period at which carbon dioxide ($CO_2$) is present and the period at which metallic lithium precipitates. As a result, precipitated metallic lithium can be rendered harmless effectively, and the above drawbacks can be overcome.

So long as the effect of the present disclosure is not significantly impaired thereby, the nonaqueous electrolyte solution of a lithium ion secondary battery according to the present embodiment may contain various additives, for instance, gas generating agents such as biphenyl (BP), cyclohexyl benzene (CHB) or the like; coating film-forming agents; dispersants; and thickeners.

The nonaqueous electrolyte solution of a lithium ion secondary battery according to the present embodiment can be used in a lithium ion secondary battery, in accordance with a known method. By using the nonaqueous electrolyte solution of a lithium ion secondary battery according to the present embodiment in a lithium ion secondary battery, it becomes possible to render precipitated metallic lithium harmless in that lithium ion secondary battery.

Therefore, the configuration of a lithium ion secondary battery provided with the nonaqueous electrolyte solution of a lithium ion secondary battery according to the present embodiment will be explained next on the basis of an example, with reference to accompanying drawings. However, the configuration of the lithium ion secondary battery is not limited to the example described below. In the drawings below, members and portions that elicit identical effects are explained while denoted by identical reference numerals. Dimensional relationships in the figures (for instance, length, width and thickness) do not reflect actual dimensional relationships.

A lithium ion secondary battery 100 illustrated in FIG. 1 is a sealed-type battery constructed by accommodating a flat-shaped wound electrode body 20 and a nonaqueous electrolyte solution 80 in a flat square battery case (i.e. outer container) 30. The battery case 30 is provided with a positive electrode terminal 42 and a negative electrode terminal 44 for external connection, and with a thin-walled safety valve 36 configured to relieve internal pressure in the battery case 30 when the internal pressure rises to or above a predetermined level. An injection port (not shown) for injecting the nonaqueous electrolyte solution 80 is provided in the battery case 30. The positive electrode terminal 42 is electrically connected to a positive electrode collector plate 42a. The negative electrode terminal 44 is electrically connected to a negative electrode collector plate 44a. For instance, a lightweight metallic material of good thermal conductivity, such as aluminum, is used as the material of the battery case 30.

Figure 2:
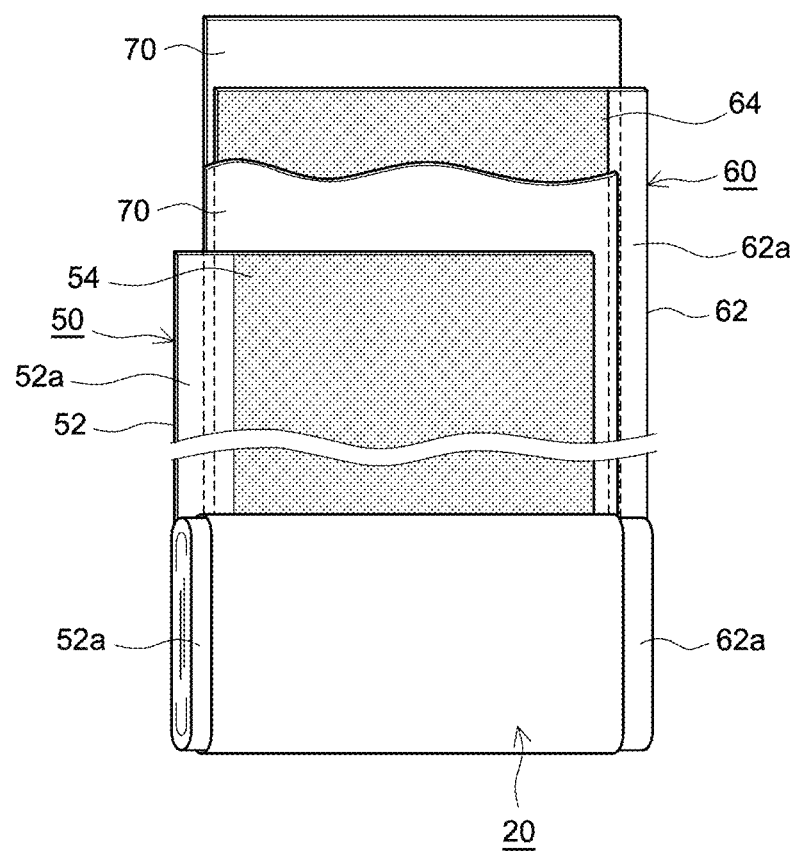
FIG. 2 is a schematic exploded-view diagram illustrating the configuration of a wound electrode body of a lithium ion secondary battery that utilizes a nonaqueous electrolyte solution according to an embodiment of the present disclosure.

As illustrated in FIG. 1 and FIG. 2, the wound electrode body 20 has a configuration resulting from laminating a positive electrode sheet 50 and a negative electrode sheet 60 with two elongated separator sheets 70 interposed in between, and winding the resulting laminate in the longitudinal direction. The positive electrode sheet 50 has a configuration in which a positive electrode active material layer 54 is formed, in the longitudinal direction, on one or both faces (herein both faces) of an elongated positive electrode collector 52. The negative electrode sheet 60 has a configuration in which a negative electrode active material layer 64 is formed, in the longitudinal direction, on one or both faces (herein both faces) of an elongated negative electrode collector 62. A positive electrode active material layer non-formation portion 52a (i.e. exposed portion of the positive electrode collector 52 at which the positive electrode active material layer 54 is not formed) and a negative electrode active material layer non-formation portion 62a (i.e. exposed portion of the negative electrode collector 62 at which the negative electrode active material layer 64 is not formed) are formed so as to respectively protrude outward from either edge of the wound electrode body 20 in a winding axis direction thereof (i.e. sheet width direction perpendicular to the longitudinal direction). The positive electrode active material layer non-formation portion 52a and the negative electrode active material layer non-formation portion 62a are joined to the positive electrode collector plate 42a and the negative electrode collector plate 44a, respectively.

Electrode sheets identical or similar to those used in conventional lithium ion secondary batteries can be used, without particular limitations, as the positive electrode sheet 50 and the negative electrode sheet 60. A typical implementation thereof is illustrated below.

Examples of the positive electrode collector 52 that makes up the positive electrode sheet 50 include an aluminum foil. The positive electrode active material layer 54 contains at least a positive electrode active material. Examples of the positive electrode active material include lithium-transition metal oxides (for example $LiNi_{1/3}Co_{1/3}Mn_{1/3}O_2$, $LiNiO_2$, $LiCoO_2$, $LiFeO_2$, $LiMn_2O_4$, $LiNi_{0.8}Co_{0.15}Al_{0.5}O_2$ and $LiNi_{0.5}Mn_{1.5}O_4$), and lithium-transition metal phosphate compounds (for example $LiFePO_4$). The positive electrode active material layer 54 may contain components other than the active material, for instance, a conductive material and a binder. For instance, carbon black such as acetylene black (AB) or other carbon materials (for instance, graphite) can be suitably used as the conductive material. For instance, polyvinylidene fluoride (PVDF) can be used as the binder.

Examples of the negative electrode collector 62 that makes up the negative electrode sheet 60 include a copper foil. The negative electrode active material layer 64 contains at least a negative electrode active material. A carbon material such as graphite, hard carbon or soft carbon can be used as the negative electrode active material, and graphite is desired herein. The negative electrode active material layer 64 may contain components other than the active material, for instance, a binder and a thickener. For instance, styrene butadiene rubber (SBR) or the like can be used as the binder. For instance, carboxymethyl cellulose (CMC) or the like can be used as the thickener.

Examples of the separator 70 include a porous sheet (film) made of a resin such as polyethylene (PE), polypropylene (PP), polyester, cellulose or polyamide. Such a porous sheet may have a single-layer structure or a multilayer structure of two or more layers (for instance, a three-layer structure in which PP layers are laid on both faces of a PE layer). A heat resistant layer (HRL) may be provided on the surface of the separator 70.

A nonaqueous electrolyte solution of a lithium ion secondary battery according to the present embodiment described above is used as the nonaqueous electrolyte solution 80. It should be noted that FIG. 1 does not depict strictly the amount of nonaqueous electrolyte solution 80 that is injected into the battery case 30.

The lithium ion secondary battery 100 can be used in various applications. Suitable examples of applications include drive power sources mounted on vehicles such as battery electric vehicles (BEV), hybrid electric vehicles (HEV), and plug-in hybrid electric vehicles (PHEV). Further, the lithium ion secondary battery 100 can be used as a storage battery for a small power storage device and the like. The lithium ion secondary battery 100 may also be used typically in the form of a battery pack in which a plurality of batteries 100 are connected in series and/or in parallel.

The explanation above concerns a square lithium ion secondary battery 100 provided with a flat-shaped wound electrode body 20 as an example. However, the lithium ion secondary battery can also be configured in the form of a lithium ion secondary battery that has a stacked-type electrode body (i.e. electrode body in which multiple positive electrodes and multiple negative electrodes are alternately laid up on each other). The lithium ion secondary battery can be configured in the form of a cylindrical lithium ion secondary battery, a laminate-cased lithium ion secondary battery or the like.

Examples pertaining to the present disclosure will be explained below, but the present disclosure is not meant to be limited to the features illustrated in the examples.

1. Examination of Additive Type

Preparation of Nonaqueous Electrolyte Solutions

A mixed solvent containing ethylene carbonate (EC), ethyl methyl carbonate (EMC), and dimethyl carbonate (DMC) at a volume ratio of 3:3:4 was prepared as a nonaqueous solvent. Then, $LiPF_6$ was added as an electrolyte salt, to the mixed solvent, to a concentration of 1.16 M (1.16 mol/L). Then, any one of benzoic acid, 1-naphthalene carboxylic acid and 2-naphthalene carboxylic acid was added, or was not added, as the aromatic carboxylic acid compound, and any one of bromobenzene, iodobenzene and 2-iodonaphthalene was added, or was not added, as an aryl halide compound. The concentration of each aromatic carboxylic acid compound and each aryl halide compound was set to 1.0 mM (1.0 mmol/L).

Production of Lithium Ion Secondary Batteries for Evaluation

Herein, $LiNi_{1/3}Co_{1/3}Mn_{1/3}O_2$ (LNCM) as a positive electrode active material, acetylene black (AB) as a conductive material, and polyvinylidene fluoride (PVdF) as a binder, were mixed, at a mass ratio of LNCM:AB:PVdF=87:10:3, with N-methylpyrrolidone (NMP), to prepare a slurry for forming a positive electrode active material layer. This slurry was applied onto an aluminum foil and was dried, to produce a positive electrode sheet having a positive electrode active material layer. The dimensions of the positive electrode active material layer were set to 47 mm×45 mm.

Then, graphite (C) as a negative electrode active material, styrene butadiene rubber (SBR) as a binder and carboxymethyl cellulose (CMC) as a thickener were mixed, at a mass ratio of C:SBR:CMC=98:1:1, with ion-exchanged water, to prepare a slurry for forming a negative electrode active material layer. This slurry was applied onto a copper foil and was dried, to produce a negative electrode sheet having a negative electrode active material layer. The dimensions of the negative electrode active material layer were set to 49 mm×47 mm.

A separator obtained by working a microporous polypropylene sheet into a bag shape was also prepared. The dimensions of the separator were set to 51 mm×49 mm.

The positive electrode sheet and the negative electrode sheet were housed in a bag-shaped separators, respectively, after which the positive electrode active material layer and the negative electrode active material layer were superimposed so as to face each other, to produce an electrode body. Collector terminals were attached to this electrode body, and the resultant was accommodated in a laminate case. Each nonaqueous electrolyte solution of the respective test example was injected into the laminate case, and the laminate case was sealed by heat fusion, to yield a respective lithium ion secondary battery for evaluation.

Evaluation of Suppression of Metallic Lithium Precipitation

Each lithium ion secondary battery for evaluation produced above was subjected to 30 cycles of charge and discharge in which one cycle includes constant-current charging from 3.0 V up to 4.25 V, at a current value of 0.3 C, and constant-current discharging from 4.25 V down to 3.0 V at 0.3 C. Thereafter, each lithium ion secondary battery for evaluation was disassembled, and the Li precipitation area on the negative electrode was determined. A value calculated using the obtained area and Expression (1) below was used as the Li precipitation suppression rate (%) of the respective test example. The evaluation results are given in Table 1.

Li precipitation suppression rate (%)=[{(Li precipitation area of test example without addition*)−(Li precipitation area in other test example)}/(Li precipitation area of test example without addition)]×100    Expression (1):

(*Test example without addition=test example with neither aromatic carboxylic acid compound nor aryl halide compound added thereto)

TABLE 1

| | | Aromatic carboxylic acid compound | | |
|---|---|---|---|---|
| | | None | Benzoic acid | 1-naphthalene carboxylic acid | 2-naphthalene carboxylic acid |
| Aryl halide compound | None | 0% | 1% | — | — |
| | Bromobenzene | 1% | 21% | 22% | 20% |
| | Iodobenzene | — | 25% | 20% | 35% |
| | 2-iodonaphthalene | — | 42% | 15% | 40% |

The results of Table 1 reveal that the precipitation area of metallic lithium can be significantly reduced by using an aromatic carboxylic acid compound and an aryl halide compound in combination. That is, it is found that precipitated metallic lithium can be rendered harmless. In particular, a combination of an aryl iodide compound and benzoic acid or 2-naphthalene carboxylic acid afforded a very high Li precipitation suppression rate; among such combinations, the Li precipitation suppression rate was remarkably high, at 40% or above, in the case of a combination of naphthalene iodide and benzoic acid or 2-naphthalene carboxylic acid. The high reactivity of naphthalene iodide is deemed to be the underlying reason for this.

2. Examination of Nonaqueous Solvent Type

A mixed solvent containing EC, EMC and DMC at a volume ratio of 3:3:4, as well as tetrahydrofuran (THF), and glyme, were prepared as nonaqueous solvents. To these nonaqueous solvents, there was added $LiPF_6$ to a concentration of 1.16 mol/L, and benzoic acid and 2-iodonaphthalene to a concentration of 1.0 mM (1.0 mmol/L) each. Lithium ion secondary batteries for evaluation were produced in the same way as above, using these nonaqueous electrolyte solutions, and suppression of metallic lithium precipitation was evaluated in the same way as above. The results are illustrated in FIG. 3.

Figure 3:
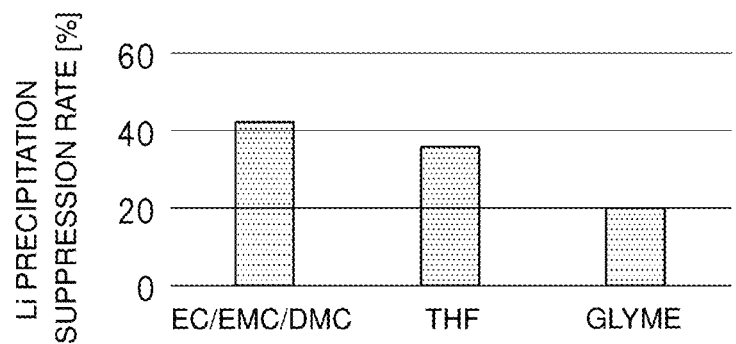
FIG. 3 is a graph illustrating a Li precipitation suppression rate in the examination of types of nonaqueous solvent.

As the results in FIG. 3 reveal, the nonaqueous electrolyte solution that utilized a mixed solvent of EC/EMC/DMC which are carbonates, the nonaqueous electrolyte solution that utilized THF which is a cyclic ether, and the nonaqueous electrolyte solution that utilized glyme which is a chain ether, all exhibited a Li precipitation suppression rate of 20% or higher. The nonaqueous electrolyte solution that utilized a mixed solvent of EC/EMC/DMC exhibited the highest Li precipitation suppression rate, namely a Li precipitation suppression rate that was about twice that of the nonaqueous electrolyte solution that utilized glyme.

3. Examination of Additive Concentration

A mixed solvent containing EC, EMC and DMC at a volume ratio of 3:3:4 was prepared as a nonaqueous solvent. To this mixed solvent, there were added $LiPF_6$ to a concentration of 1.16 mol/L, and benzoic acid and 2-iodonaphthalene to a concentration of 0.01 mM (1.0 mmol/L), 0.1 mM, 1.0 mM, 10 mM or 100 mM, to produce respective nonaqueous electrolyte solutions. Lithium ion secondary batteries for evaluation were produced in the same way as above, using these nonaqueous electrolyte solutions, and suppression of metallic lithium precipitation was evaluated in the same way as above. The results are illustrated in FIG. 4.

Figure 4:
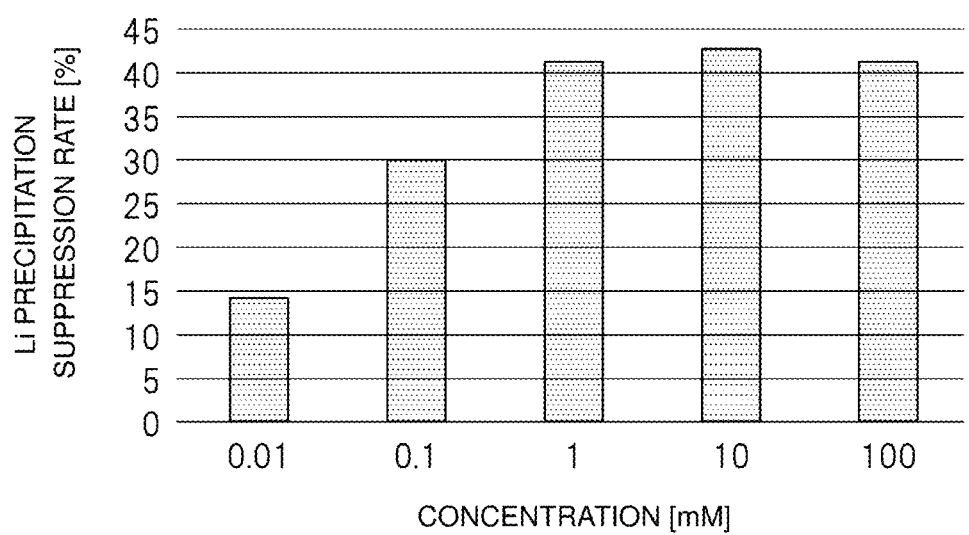
FIG. 4 is a graph illustrating a Li precipitation suppression rate in the examination of the concentration of additives (benzoic acid and 2-iodonaphthalene).

As the results in FIG. 4 reveal, a metallic lithium precipitation suppression effect close to 15% was exhibited even when the concentration of benzoic acid and 2-iodonaphthalene was very low, of 0.01 mM. It was observed that the metallic lithium precipitation suppression effect tended to become more pronounced as the concentration of benzoic acid and 2-iodonaphthalene increased, up to 1 mM. The metallic lithium precipitation suppression effect remained substantially unchanged once the concentration of benzoic acid and 2-iodonaphthalene exceeded 1 mM.

The above results indicate that in the nonaqueous electrolyte solution of a lithium ion secondary battery according to the present embodiment, explained above, precipitated metallic lithium can be rendered harmless in the lithium ion secondary battery.

Concrete examples of the present disclosure have been explained in detail above, but the examples are merely illustrative in nature, and are not meant to limit the scope of the claims in any way. The art set forth in the claims encompasses various alterations and modifications of the concrete examples illustrated above.

What is claimed is:

1. A nonaqueous electrolyte solution of a lithium ion secondary battery, comprising:
    a lithium salt as an electrolyte salt;
    a nonaqueous solvent; and
    an aromatic carboxylic acid compound and an aryl halide compound, as additives.

2. The nonaqueous electrolyte solution according to claim 1, wherein the concentration of the aromatic carboxylic acid compound is not less than 0.01 mmol/L but not more than 100 mmol/L, and the concentration of the aryl halide compound is not less than 0.01 mmol/L but not more than 100 mmol/L.

3. The nonaqueous electrolyte solution according to claim 1, wherein the nonaqueous solvent is a carbonate.

4. The nonaqueous electrolyte solution according to claim 1, wherein the aromatic carboxylic acid compound is benzoic acid or 2-naphthalene carboxylic acid, and the aryl halide compound is an aryl iodide compound.

5. A lithium ion secondary battery, comprising:
    a positive electrode;
    a negative electrode; and
    the nonaqueous electrolyte solution according to claim 1.

6. The nonaqueous electrolyte solution according to claim 1, wherein the aromatic carboxylic acid compound is a compound in which a carboxyl group is bonded to an aromatic ring.

* * * * *